US007827054B2

(12) United States Patent
Campbell et al.

(10) Patent No.: US 7,827,054 B2
(45) Date of Patent: Nov. 2, 2010

(54) ONLINE ENTERTAINMENT NETWORK FOR USER-CONTRIBUTED CONTENT

(75) Inventors: Benjamin Clark Campbell, Winchester, MA (US); Mark Francis Ranalli, Andover, MA (US)

(73) Assignee: OurStage, Inc., Chelmsford, MA (US)

( * ) Notice: Subject to any disclaimer, the term of this patent is extended or adjusted under 35 U.S.C. 154(b) by 91 days.

(21) Appl. No.: 11/541,419

(22) Filed: Sep. 29, 2006

(65) Prior Publication Data

US 2008/0091509 A1    Apr. 17, 2008

(51) Int. Cl.
*G06Q 90/00*    (2006.01)
(52) U.S. Cl. ...................................... 705/10
(58) Field of Classification Search .............. 705/12
See application file for complete search history.

(56) References Cited

U.S. PATENT DOCUMENTS

| | | | | |
|---|---|---|---|---|
| 5,963,916 | A * | 10/1999 | Kaplan ...................... | 705/26 |
| 6,272,467 | B1 * | 8/2001 | Durand et al. ................ | 705/1 |
| 6,631,362 | B1 * | 10/2003 | Ullman et al. ............... | 706/60 |
| 6,963,848 | B1 | 11/2005 | Brinkerhoff | |
| 6,968,243 | B1 * | 11/2005 | Oh ............................ | 700/91 |
| 7,162,433 | B1 * | 1/2007 | Foroutan .................... | 705/11 |
| 7,587,391 | B1 * | 9/2009 | Bostock et al. .............. | 707/3 |
| 2002/0120501 | A1 | 8/2002 | Bell | |
| 2002/0138362 | A1 | 9/2002 | Kitze | |
| 2002/0138471 | A1 | 9/2002 | Dutta | |
| 2002/0194066 | A1 | 12/2002 | Shultz | |
| 2003/0004749 | A1 * | 1/2003 | Toneaki ...................... | 705/1 |
| 2003/0105812 | A1 | 6/2003 | Flowers | |
| 2003/0171982 | A1 * | 9/2003 | Paul ........................... | 705/12 |
| 2003/0217171 | A1 | 11/2003 | Von Stuermer | |

(Continued)

FOREIGN PATENT DOCUMENTS

AU    2004101054 A1    2/2005

(Continued)

OTHER PUBLICATIONS

Clive L. Dym, et al., "Rank Ordering Engineering Designs: Pairwise Comparison Charts and Borda Counts," Research in Engineering Design 13 (2002) pp. 236-242.*

(Continued)

*Primary Examiner*—Beth V Boswell
*Assistant Examiner*—Neil R Kardos
(74) *Attorney, Agent, or Firm*—Clock Tower Law Group; Erik J. Heels; Michael A. Bartley

(57) ABSTRACT

The invention includes a system for providing an online entertainment network for user-contributed entertainment content. The system quickly and accurately identifies quality content from a vast pool of user-contributed content. User-contributed content is rated by those who contribute and those who view content. Fraud detection devices automatically detect and remove fraudulent ratings. Contests and prizes associated with specific categories of content provide incentives for contributors to provide quality content and rate many pairs of items. Contests may be localized by geography, organization, social network, and other relationships. Identified top-rated content is made available individually, or as a continuous stream of user-contributed entertainment content.

23 Claims, 2 Drawing Sheets

U.S. PATENT DOCUMENTS

| | | |
|---|---|---|
| 2003/0227479 A1 | 12/2003 | Mizrahi |
| 2005/0240596 A1 | 10/2005 | Worthen |
| 2005/0240618 A1 | 10/2005 | Nickerson |
| 2006/0212444 A1* | 9/2006 | Handman et al. ............... 707/5 |
| 2007/0156507 A1* | 7/2007 | Connelly et al. ............. 705/10 |
| 2008/0000970 A1* | 1/2008 | Savage et al. ............... 235/386 |
| 2008/0126197 A1* | 5/2008 | Savage et al. ................ 705/14 |

FOREIGN PATENT DOCUMENTS

| | | |
|---|---|---|
| WO | WO0150279 A1 | 7/2001 |
| WO | WO0167357 A2 | 9/2001 |
| WO | WO2005086043 A2 | 9/2005 |

OTHER PUBLICATIONS

James Green-Armytage, "Introducing Cardinal-weighted Pairwise Comparison," accessible at http://fc.antioch.edu/~james_green-armytage/cwp13.htm, accessed via the WayBack machine at http://www.archive.org on Dec. 15, 2005.*

Iqbal Ali, et al., "On the Minimum Violations Ranking of a Tournament," Management Science 32:6 (1986) pp. 660-672.*

S. I. Glass, "Tournaments, Transitivity and Pairwise Comparison Matrices," The Journal of the Operational Research Society 49:6 (1998) pp. 616-624.*

* cited by examiner

ONLINE ENTERTAINMENT NETWORK FOR USER-CONTRIBUTED CONTENT

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Copyright 2006 Helium Entertainment LLC. All rights reserved.

CROSS REFERENCE TO RELATED APPLICATIONS

None.

BACKGROUND OF THE INVENTION

This invention relates to methods and systems for identifying and providing top-rated user-contributed entertainment content over a networked system. This invention also relates to providing contests for user-contributed entertainment content.

Online, user-contributed content has increased dramatically in popularity. An unprecedented volume of user-contributed content is being loaded onto the web daily. This volume comes from a broad cross-section of web users as millions of people are now posting content on the web. Social networking websites account for much of the traffic associated with user-contributed content.

There are several types of content that web users are contributing. One type of content is encyclopedic information. Websites, such as Wikipedia (www.wikipedia.org), allow users to write articles and explanations on numerous subjects. Another type of content is personal content. Social networking websites, such as myspace.com, allow individuals to post personal content to the world or to a network of contacts. Another type of content is opinion and editorial content. Websites, such as Blogger (www.blogger.com) and others, enable individuals to start a weblog to write or opine on any topic. Another type of content is entertainment content. With wide consumer access to digital cameras and camcorders and other digital recording devices, web users can easily post amateur video, photography, and music. Websites, such as Flickr (www.flickr.com), enable web users to post and share photos. Websites such as Youtube (www.youtube.com) enable users to post amateur films, reality videos, music videos, and many other types of video entertainment.

As millions of web users contribute videos, photos, songs, and performances, there are also millions who want to view the best user-contributed content as online entertainment. With millions of items of available content, there is a plethora of undesirable content available. The problem is finding the best online user-contributed entertainment content from a sea of undesirable content. Users are essentially "surfing" content databases to find something interesting. Most of users' time is spent previewing many video clips in hopes of finding a few entertaining clips.

One solution for identifying desirable content, is to use professional reviewers or editors. Many websites list a category of content as "Editors' Picks" containing content judged as desirable, or as quality content, by a small group of paid reviewers. This solution for identifying desirable content suffers from several drawbacks. A professional reviewer system is time intensive and costly. With millions of items of content submitted, it is impractical for a small group of professional editors to review each submission. Also, to hire a sufficient number of editors to review all content submitted is cost prohibitive. Another drawback in such a system is that entertainment reviewers are relying on the opinion of a small group of individuals to determine what the masses desire.

Another solution for identifying desirable entertainment content is a computerized review system. In a computerized review system, evaluation by humans is replaced with machines, computer software or the like. Such computerization enables an entire pool of content to be evaluated at a low cost. The obvious defect in a computerized system is inability to review content on an emotional level to assess an entertainment value.

Another solution is a peer review system. The most plentiful resource available for rating user-contributed content is the contributors and viewers themselves. The collective time of millions of contributors can be used for rating the enormous volume of user-contributed entertainment content. In such a system, a contributor or viewer is presented with a video clip or image and asked to rate the content. A website can also track viewing activities of users. Tracking activity and requesting ratings yields several groups of content. These groups include "Highest Rated", "Most Emailed", "Most Discussed", and "Most Viewed". Yet such systems suffer from several disadvantages.

One disadvantage of user review systems is the enormous potential for abuse. Because users often compete against each other, there is an inherent conflict of interest that leads to fraudulent ratings. A common practice is for a user to rate works of other contributors with low scores in an effort to boost a user's own score. Another common practice is creating multiple fraudulent accounts for a user to rate his own submitted work with a high rating from several accounts. In another practice, a user with many social contacts can ask those contacts to view his content to increase the number of views which makes it more likely that such content will be included on a "most popular" group. Additionally, posted content can achieve a fraudulent 5-star rating after only a few friends quickly rate a particular item of content as 5-star content.

Another disadvantage of user review systems is providing an accurate and reliable ranking system using reviewers who are not expert reviewers. Traditionally, user review systems have used a scalar method of rating content. For example, a reviewer is asked to rate a work on a scale of 1-10. Averaging the individual ratings from reviewers provides a consensus, but this calculation erroneously assumes that the evaluation skills of each user reviewer are equal. Such an erroneous assumption often yields misleading or inaccurate results. The scalar method also suffers from dead-ends of the scale. If a reviewer scores an item as "10" on a scale of 1 to 10, and the next reviewed item is better than the last item scored as "10," then entered scores must be changed to compensate for the inaccuracy. Thus the scalar method asks a reviewer for an absolute score of an item without being able to simultaneously compare that item to all existing content.

Another measurement technique is a simple relative measurement scale. For example, a reviewer is asked to choose the better of A vs. B. Results are tallied from several A vs. B comparisons. While there are no dead ends with simple relative measurements, this technique less efficiently finds a consensus because it does not directly collect quantified ratings.

Another problem in identifying desirable content in the user-contributed entertainment industry is a lack of a clear content classification standard. Contributor-defined classification, or "tagging", is the primary method of identifying a genre for a video or image. Since most users would like their content to be viewed by as many people as possible, there is a tendency to use dozens of tags to define a clip. Such "tag stuffing" makes it difficult to for viewers to search for desirable content as search results would present many clips that are incorrectly identified. This leads to a poor user experience.

Another problem with the user-contributed entertainment industry is that there is no lasting value for the contributors of content, beyond a temporary fame from other users viewing a clip. A problem for providers of websites that host user-contributed entertainment content, is that there is a limited opportunity for advertising revenue. Major advertisers are generally wary of having their advertisements appear next to dubious, random, and potentially offensive content. With no level of comfort in type and quality of user-contributed content, advertisers are reluctant to advertise on user-contributed entertainment websites.

Therefore, what is needed is an online entertainment network for user-contributed content that accurately identifies content that is high quality, top rated, and desirable for entertainment. What is further needed is such a network that provides an incentive to users to contribute desirable content and accurately rate content. What is further needed is such a network that provides a clear classification standard. What is further needed is such a network that provides broad advertising opportunities.

SUMMARY OF THE INVENTION

The invention includes a method of providing an online entertainment network for user-contributed content. The invention provides a website or similar electronic network for receiving entertainment works from entertainment contributors for various categories of entertainment. Entertainment works include films, videos, photography, modeling, performances, animations, music and so forth. The invention selects and provides to contributors or viewers, a pair of video clips, or other entertainment content, to rate. The invention also provides an interface for rating the pair of entertainment works. The interface provides a mechanism for receiving a rating input, from an entertainment reviewer, that indicates how a first presented entertainment work from the pair compares relative to a second presented entertainment work from the pair according to a predetermined rating criterion. The rating criterion can be any standard for comparison. For example, the rating mechanism may ask a reviewer which of two clips is more humorous, which is better quality, which is more entertaining, or which is worst. The rating mechanism can include fields for receiving inputs, buttons, or a sliding scale with an icon that a reviewer can slide by degrees between two clips to indicate a better clip. For musical performance clips, the rating question can be which performer or performance is better. For comparing two images of user-contributed model content, the rating question can be which person is more attractive.

The invention identifies top-rated works for multiple entertainment categories based on relative ratings received from entertainment reviewers. After receiving many relative comparisons, the invention weighs rating inputs and sorts rated works of entertainment to identify a group of top-rated entertainment works.

Top-rated entertainment works are then provided to viewers of user-contributed entertainment. Top-rated works can be browsed, streamed or added to a play list. Viewers can manually create play lists, or create smart play lists. For example, top-rated works are identified by category and made available for selection by viewers. Sets of top-rated works, or viewer play lists, can be continuously streamed, back to back, upon a single click by a viewer, thereby providing an online entertainment channel of continuous, quality entertainment.

The invention includes a method of conducting a contest for competing entertainment works. A contest for a particular type or class of entertainment content is identified. A networked system receives entertainment works from entertainment contributors for the identified contest. Competing contributors and/or entertainment viewers can rate submitted content. As described above, reviewers rate works on a relative scale based on a particular rating criterion. Rated works can be sorted from highest to lowest to determine a contest winner. Alternatively, a group of top-rated entertainment works can be made available to entertainment viewers, along with a voting mechanism for entertainment viewers to vote on top-rated works to determine a winning entertainment work. A time period for voting can be established. Any mechanism or method of receiving votes can be used. Ideally, votes are received either online, by phone, or through text messaging, but votes may be received through other electronic means.

The invention can offer cash and other prizes as incentives to users to contribute quality works and rate many pairs of works. Contributors may be charged a fee for uploading content, or charged for each identifier tag. Such fees reduce instances of tag stuffing and increase the quality of submitted content.

Contests can be regional, local, or customized based on various common relations. For example, people living in the city of Midway can set up a contest for the best comedy video clip, or the best baby picture. Any resident of Midway can contribute content, rate content, and vote on top-rated content. Other criteria for customizing contests can include high school or high school class, college, fraternity, state, company, organization, and social network group. For example, a company can customize a contest to determine a best employee-contributed video; a high school could set up a contest to determine a best school year theme or best looking couple; a state could set up a contest to find the best singer from the state; a group of international scientists could start a modeling contest to determine the most attractive scientist. Organizers of such contests can determine who or what group of people can contribute content, rate, and vote. Organizers can determine what type of content is acceptable for each contest.

An important aspect of the invention is its method of collaborative rating. A system of comparisons (A vs. B) sorts items rather than the standard scalar method of rating and sorting (rating from one to ten). The system of comparisons includes variable measurement devices to accurately rate a large group of items of entertainment content while the review load of each reviewer is relatively small. Additional devices, such as control works, prevent a reviewer from subverting the system by rating all works of others low, while simultaneously rating his work high. Reviewers that try to cheat the system in this and other ways are easily identified by the system.

This invention uses variable relative measurement techniques but provides an evaluator with multiple choices. A reviewer is not simply asked if Item A is better than Item B, but is asked how much better Item A is than Item B. This variable measurement technique allows the system to accurately rank results using fewer comparisons than is required with a simple relative measurement system. By receiving variable relative ratings, individual rating comparisons can be weighted. Reviewers themselves can also be rated to assess a level of expertise of each reviewer. By determining a level of expertise of each reviewer, the system can apply a degree of weight to ratings from that reviewer.

An advantage of the present invention is the reduced number of sorts required for accurate rankings. The present invention is driven by a predictive algorithm that lowers the number of ratings a reviewer must do to create a highly accurate, sorted list. Optionally, the invention can minimize the work by including an item the reviewer has already seen when presenting another pair of items to compare. Contributors have an incentive to rate many pairs of entertainment works, because the more often a contributor rates a pair of works, the more a contributor's work will be include in other pairs of works to be rated.

Another advantage afforded by the present invention is the practical elimination of fraudulent ratings. The combination of the variable relative rating system and control works scattered within groups of works, results in easy and automated identification of fraudulent ratings. The control works include real and/or fake works that are known to be high-rated or low-rated works based on a given rating criterion. If a reviewer gives a rating of a control work that is contrary to the known quality of that control work, then the system can mark ratings from that reviewer as fraudulent and not consider such ratings for calculations to determine top-rated works. Additionally, the invention can establish a fee for purchasing identifier tags on contributed content. By purchasing identifier tags, a contributor will be less likely to select dozens of tags to identify a clip.

Another advantage of the present invention is that it can offer fame and compensation to creators and contributors of entertainment content, and a dramatically superior entertainment experience for viewers of user-contributed entertainment content. The invention quickly and efficiently identifies the best amateur video, music, modeling, and photography content.

Another advantage of the invention is improved advertising opportunities in a user-contributed entertainment content environment. The community rating process enables the invention to screen out objectionable content. With objectionable content excluded from streams of top-rated content, advertisers have a high level of comfort in advertising on such streams of amateur entertainment content.

Another advantage of the present invention is eliminating the need to surf user-contributed content websites to find quality content. Instead of surfing, a visitor can simply search for a specific category and then have access to top-rated content without have to personally sift through thousands of items of worthless content. Instead of viewers wasting their time scanning millions of items of poor quality content, the collective judgment of the crowds is harnessed to quickly and efficiently separate great content from the sea of mediocre content.

Thus, the present invention creates an improved online entertainment network where visitors can easily find top-rated user-contributed entertainment content. A system of contests and variable relative rating comparisons helps to quickly and accurately identify top-rated content. The rating review load for each reviewer is small, yet the invention accurately identifies top-rated works while filtering fraudulent ratings. The true wisdom of the crowd is used to quickly identify desirable content. Top-rated items of content in a given "channel" or category can be streamed back-to-back to create an online entertainment experience similar to televised entertainment programing.

DETAILED DESCRIPTION OF THE INVENTION, INCLUDING THE PREFERRED EMBODIMENT

Figure 1:
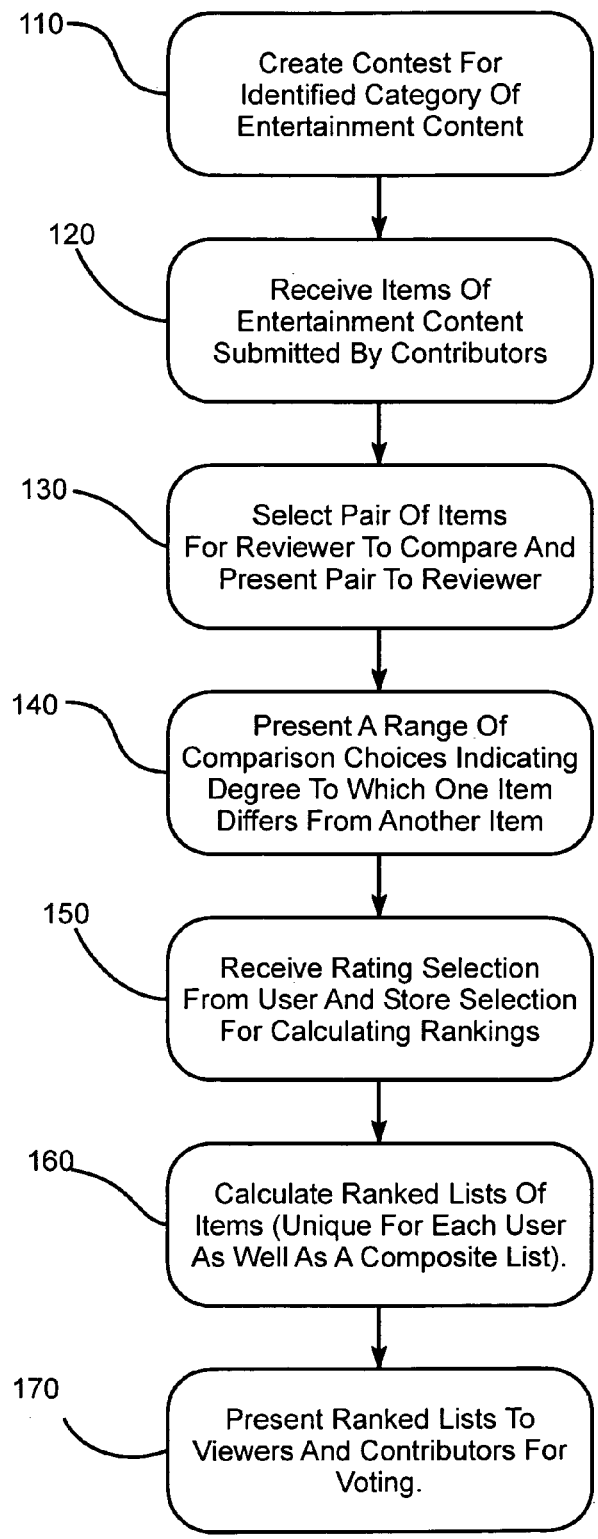
FIG. 1 is a flowchart showing the contest process for identifying a winning user-contributed entertainment item.

The preferred embodiment of the invention is embodied in a website for user-contributed amateur entertainment content. Other electronic systems besides websites may be used. Website visitors initially choose from a few broad categories, of entertainment, such as (1) music, (2) video clips, and (3) modeling and photography. Any number of entertainment genres can be used with associated subcategories. For example, the music genre can include channels for pop music, classical music, rock music, country music, and other music varieties. Within the video clip genre, can exist channels for stand-up comedy, car chases, fishing accidents, short films, animations, wedding disasters, movie parodies, and so forth. New categories or channels of user-contributed entertainment can be defined by users.

In the music genre, Indie and amateur musicians and singers participate in music contests. A nominal fee may be charged for each tag used to identify categories or contents in which an item is submitted. Such a fee charged can reduce spamming for submitted items. Contributors of items of music content have an obligation to rate items from other contributors. An incentive for a contributor to rate is that the more often a contributor rates the more often a contributor's item is presented to others to be rated. Presenting an item more often in pairs of content to be rated does not necessarily cause a particular item to become top-rated, but it does provide a more accurate rating because a larger portion of the crowd has had a chance to rate the item. For contests with cash prizes, there is an inherent incentive to garner accurate ratings.

The music genre can be segmented by Indie artists and pure amateur artists. Channels for amateur artists can include short video clips of singing auditions, karaoke video clips, music video contests, regional and local contents, and "worst of" channels.

In the video clip entertainment section, visitors can choose from any number of channels such as: Stand-up Comedy, Best Car Chases, Original Short Films, Wedding Disasters, Best Bull Fighting Moments, Best Beer Commercial, Best New Movie Trailer, etc. As with other genres, the invention allows visitors to view top-rated videos in each channel— either individually or streamed continuously similar to television viewing. The invention can select a particular number of top-rated works, such as the top 100 rated clips, and stream these clips back-to-back upon a user making a single click to select a desired channel.

For a modeling genre, the invention provides visitors the ability to immediately view top-rated beautiful people. Channels or categories of modeling content can be divided by color of hair, height, ethnicity, lack of hair, age, gender, geography, and other categories. There can be contests for face shots, full body modeling, swim wear, casual wear, formal wear, ethnic dress, runway modeling or hand modeling. People from different regions or groups can create their own contest and channels. Colleges, cities and other organizations can create their own beauty competitions.

As a marketing campaign, companies can create a channel and contest for a best commercial for a company product and allow the general public to participate to win prizes. Schools can use the invention to create scholarship contests for dramatic arts. Cash prizes for contests depend on sponsors of the contest or creators of the contest. In another model, cash prizes may come from contributor submission fees. Contests may be initiated and ended at regular intervals such as having a new contest every month.

For contests, a winning item may be determined by community rating alone, or by community rating plus community and viewer voting. In the voting model, a group of top-rated items is first determined using the variable relative rating component of the invention. The group of top-rated items is then presented to viewers for voting. There are various rules that can be used for establishing a voting system including duration of voting and how votes are counted. In a simple voting system, viewers vote for a favorite clip or person from a group of top-rated items, and the item receiving the most votes wins. During contest voting periods, the invention may receive votes through several electronic means including text messages. Optionally, a premium text voting system may be offered that charges a nominal fee to vote by text messaging.

For rating items of entertainment content, the invention uses a process of variable relative ratings for bi-directional, competitive, quality review. A peer rating engine operates through a website using the collaborative powers of the Internet to assess the quality of user-contributed entertainment content. The invention also provides contributors an option for receiving critical commentary. Content contributors review and rate each other's works, which works then become part of a ranked list.

The preferred mode of the rating engine is to assign works to be reviewed. This prevents contributors from conspiring to review works of co-conspirators. The rating engine has many alternative modes of operation. In one mode, the rating engine allows visitors who do not have content in the system to rate content.

Referring to FIG. 1, either users, or a system provider, create a contest for an identified category or channel of entertainment content (110). Items are then received by the system for an identified category (120). The system then selects a pair of items to present to a reviewer and presents these items for review (130). A rating mechanism allows a reviewer to indicate how one item differs by comparison to a second item based on a given criterion (140). After receiving relative ratings from several comparisons (150), and top-rated items are calculated (160), top-rated groups of items of entertainment are then presented to viewers for voting (170) to determine a winning item.

Figure 2:
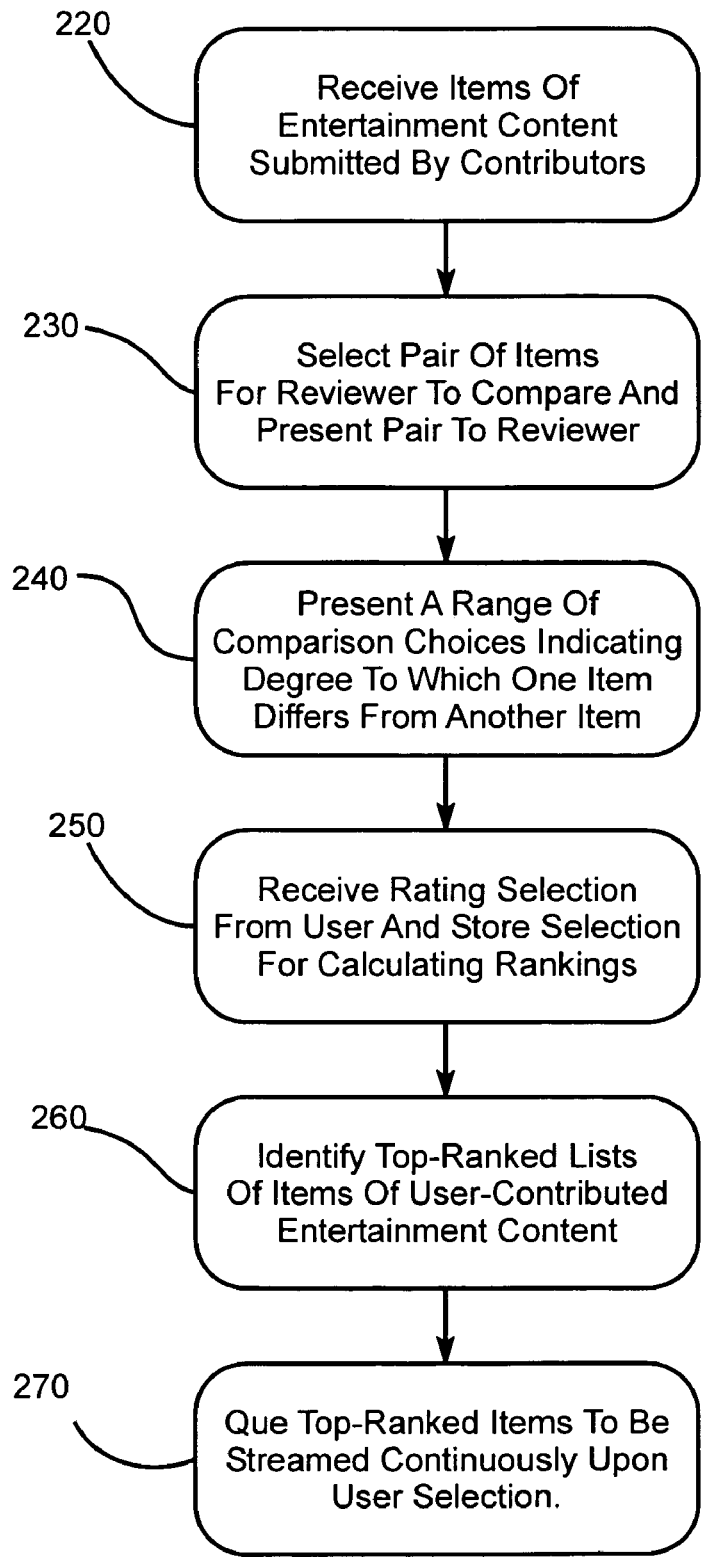
FIG. 2 is a flowchart showing the process of streaming top-rated user-contributed entertainment content.

Referring to FIG. 2, the process for streaming top-rated content is similar to the contest process. Items are received by the system for an identified category (220). The system selects a pair of items to present to a reviewer and presents these items for review (230). A rating mechanism allows a reviewer to indicate how one item differs by comparison to a second item based on a given criterion (240). After receiving relative ratings from several comparisons (250), top-rated items are identified and grouped into ranked lists by category or channel (260). Top-rated items are presented to viewers and may be viewed individually, or displayed back-to-back as a continuous stream of entertainment (270).

There are many embodiments and variations of the invention that will be apparent to persons skilled in the art. While the preferred embodiment of the invention operates with entertainment content, the invention can be applied to related areas. Additionally, top-rated and winning Indie songs and modeling photographs may be downloaded for a fee. Record labels, movie studios, and modeling agencies can use the invention actively or passively to discover talent. Established music bands can use the invention to test or launch new songs. Movie studios can pre-release movie trailers and endings on a website using the invention to get feedback from the crowd before spending millions on a movie launch. Fashion designers can use the invention to run special modeling contests to test market new fashions on the site before spending millions on manufacturing garments. Social networking websites can display channels of entertainment hosted by a website using the invention.

What is claimed is:

1. A computer-implemented method of conducting a contest for competing entertainment works, the method comprising:

providing an electronic system for receiving a plurality of entertainment works from entertainment contributors for an identified contest, wherein the identified contest is for at least four entertainment works;

providing a pair of entertainment works to rate;

providing an interface for rating the pair of entertainment works, wherein the interface provides a mechanism for receiving a relative rating, from an entertainment reviewer, that indicates how a first presented entertainment work from the pair compares relative to a second presented entertainment work from the pair according to a predetermined rating criterion;

maintaining and monitoring a plurality of control entertainment works, mixed among the entertainment works to be rated, wherein the control entertainment works have a known value based on the rating criterion;

determining whether a relative rating received from the entertainment reviewer for a control entertainment work is contrary to the known rating value for that control entertainment work;

marking relative ratings received from the entertainment reviewer as fraudulent if the relative rating received from the entertainment reviewer for a control entertainment work is contrary to the known rating value for that control entertainment work;

excluding all relative ratings received from the entertainment reviewer from consideration if one or more relative ratings from the entertainment reviewer have been marked as fraudulent;

calculating a ranked list of all entertainment works in the identified contest based on non-fraudulent relative ratings received from rating pairs of entertainment works; and identifying a winning entertainment work for the identified contest from the ranked list.

2. The method of claim 1, wherein the identified contest offers a tangible prize to a contest winner.

3. The method of claim 1, further comprising charging a fee based on identifier tags for uploading entertainment works.

4. The method of claim 1, wherein the mechanism for receiving a relative rating is configured to receive variable relative rating comparisons on a non-dead-end scale.

5. The method of claim 1, further comprising assigning entertainment works to entertainment contributors to rate.

6. The method of claim 1, further comprising providing a voting mechanism for entertainment viewers to vote on top-rated entertainment works to determine a winning entertainment work.

7. A computer-implemented method of holding a user-configurable contest for competing entertainment works, the method comprising:

providing a mechanism for setting up a contest of at least four entertainment works for a group of entertainment contributors that share a common relation;

providing an electronic system for receiving entertainment works from entertainment contributors who share the common relation;

providing a pair of entertainment works to rate;

providing an interface for rating the pair of entertainment works, wherein the interface provides a mechanism for receiving a relative rating, from an entertainment reviewer, that indicates how a first presented entertainment work from the pair compares relative to a second presented entertainment work from the pair according to a rating criterion;

maintaining and monitoring a plurality of control entertainment works, mixed among the entertainment works to be rated, wherein the control entertainment works have a known value based on the rating criterion;

determining whether a relative rating received from the entertainment reviewer for a control entertainment work is contrary to the known rating value for that control entertainment work;

marking relative ratings received from the entertainment reviewer as fraudulent if the relative rating received from the entertainment reviewer for a control entertainment work is contrary to the known rating value for that control entertainment work;

excluding all relative ratings received from the entertainment reviewer from consideration if one or more relative ratings from the entertainment reviewer have been marked as fraudulent;

calculating a ranked list, the rankings based on the rating criteria, of all entertainment works in the identified contest by processing non-fraudulent relative ratings of pairs of entertainment works as received from entertainment reviewers; and identifying a winning entertainment work for the identified contest from the ranked list.

8. The method of claim 7, wherein the mechanism for setting up the contest enables a user to define a type of entertainment work associated with the contest.

9. The method of claim 7, wherein the rating criterion is user-defined.

10. The method of claim 7, wherein said common relation is selected from the group consisting of geography, social network, and organization.

11. The method of claim 7, further comprising providing a voting mechanism for entertainment viewers and contributors to vote on top-rated entertainment works to determine a winning entertainment work.

12. A computer-implemented method of providing an online entertainment network for user-contributed content, the method comprising:

providing a website for receiving a plurality of entertainment works from entertainment contributors for multiple categories of entertainment;

providing a pair of entertainment works to be rated from a set of at least four entertainment works;

providing an interface for rating the pair of entertainment works, wherein the interface provides a mechanism for receiving a relative rating, from an entertainment reviewer, that indicates how a first presented entertainment work from the pair compares relative to a second presented entertainment work from the pair according to a predetermined rating criterion;

identifying top-rated works for multiple entertainment categories by calculating a ranked list of all entertainment works in the set of at least four based on relative ratings of pairs of entertainment works as received from entertainment reviewers; and in response to only a single action being performed, streaming a substantially continuous series of top-rated user-contributed entertainment works;

wherein an entertainment work, submitted by an entertainment contributor, is presented to be rated more often when the contributor of the entertainment work rates pairs of entertainment works more often.

13. The method of claim 12, wherein top-rated user-contributed content is streamed back-to-back by category of entertainment work.

14. The method of claim 12, further comprising providing top-rated entertainment works to be viewed individually by selection.

15. The method of claim 12, further comprising displaying advertisements in a continuous stream of top-rated user-contributed entertainment works.

16. The method of claim 12, further comprising maintaining and monitoring a plurality of control entertainment works, mixed among the entertainment works to be rated, for automatically identifying fraudulent ratings.

17. A method of providing an online entertainment network for user-contributed content, the method comprising:

providing a website for receiving a plurality of entertainment works from entertainment contributors for an identified contest having a tangible prize, wherein the identified contest is for at least four entertainment works;

providing a pair of entertainment works to rate;

providing an interface for rating the pair of entertainment works, wherein the interface provides a mechanism for receiving a relative rating, from an entertainment reviewer, that indicates how a first-presented entertainment work from the pair compares relative to a second-presented entertainment work from the pair according to a predetermined rating criterion;

maintaining and monitoring a plurality of control entertainment works, mixed among the entertainment works to be rated, wherein the control entertainment works have a known value based on the rating criterion;

determining whether a relative rating received from the entertainment reviewer for a control entertainment work is contrary to the known rating value for that control entertainment work;

marking relative ratings received from the entertainment reviewer as fraudulent if the relative rating received from the entertainment reviewer for a control entertainment work is contrary to the known rating value for that control entertainment work;

excluding all relative ratings received from the entertainment reviewer from consideration if one or more relative ratings from the entertainment reviewer have been marked as fraudulent;

identifying top-rated works for multiple entertainment categories by calculating a ranked list of all entertainment works in the identified contest based on non-fraudulent relative ratings of pairs of entertainment works as received from entertainment reviewers;

in response to only a single click, streaming a substantially continuous series of top-rated user-contributed entertainment works; and providing a voting mechanism for entertainment viewers to vote on top-rated entertainment works to determine a winning entertainment work.

18. The method of claim 17, wherein the identified contest is localized by geography, social network, organization, or company.

19. The method of claim 17, wherein top-rated user-contributed content is streamed by category of entertainment work.

20. The method of claim 17, further comprising providing top-rated entertainment works to be viewed individually by selection.

21. The method of claim 17, further comprising displaying advertisements among continuously-streamed top-rated user-contributed entertainment works.

22. A computer-implemented method of conducting a contest for competing entertainment works, the method comprising:
    providing an electronic system for receiving a plurality of entertainment works from entertainment contributors for an identified contest, wherein the identified contest is for at least four entertainment works;
    providing a pair of entertainment works to rate;
    providing an interface for rating the pair of entertainment works, wherein the interface provides a mechanism for receiving a relative rating, from an entertainment reviewer, that indicates how a first presented entertainment work from the pair compares relative to a second presented entertainment work from the pair according to a predetermined rating criterion;
    calculating a ranked list of all entertainment works in the identified contest based on relative ratings received from rating pairs of entertainment works; and
    identifying a winning entertainment work for the identified contest from the ranked list;
    wherein an entertainment work, submitted by an entertainment contributor, is presented to be rated more often when the contributor of the entertainment work rates pairs of entertainment works more often.

23. A computer-implemented method of conducting a contest for competing entertainment works, the method comprising:
    providing an electronic system for receiving a plurality of entertainment works from entertainment contributors for an identified contest, wherein the identified contest is for at least four entertainment works;
    providing a pair of entertainment works to rate;
    providing an interface for rating the pair of entertainment works, wherein the interface provides a mechanism for receiving a relative rating, from an entertainment reviewer, that indicates how a first presented entertainment work from the pair compares relative to a second presented entertainment work from the pair according to a predetermined rating criterion;
    maintaining and monitoring a plurality of control entertainment works, mixed among the entertainment works to be rated, wherein the control entertainment works have a known value based on the rating criterion;
    determining whether a relative rating received from the entertainment reviewer for a control entertainment work is contrary to the known rating value for that control entertainment work;
    marking relative ratings received from the entertainment reviewer as fraudulent if the relative rating received from the entertainment reviewer for a control entertainment work is contrary to the known rating value for that control entertainment work;
    excluding all relative ratings received from the entertainment reviewer from consideration if one or more relative ratings from the entertainment reviewer have been marked as fraudulent;
    calculating a ranked list of all entertainment works in the identified contest based on non-fraudulent relative ratings received from rating pairs of entertainment works; and
    identifying a winning entertainment work for the identified contest from the ranked list;
    wherein an entertainment work, submitted by an entertainment contributor, is presented to be rated more often when the contributor of the entertainment work rates pairs of entertainment works more often.

* * * * *